US012152914B2

(12) United States Patent
Fujikura et al.

(10) Patent No.: US 12,152,914 B2
(45) Date of Patent: Nov. 26, 2024

(54) MULTIPLE-SYSTEM ROTATION SENSOR, AND ELECTRIC POWER STEERING DEVICE PROVIDED WITH MULTIPLE-SYSTEM ROTATION SENSOR

(71) Applicant: Mitsubishi Electric Corporation, Tokyo (JP)

(72) Inventors: Shohei Fujikura, Tokyo (JP); Hiroko Ikeda, Tokyo (JP); Tatsuya Mori, Tokyo (JP); Kenji Ikeda, Tokyo (JP); Kenta Kubo, Tokyo (JP); Toshihiro Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 88 days.

(21) Appl. No.: 17/907,858

(22) PCT Filed: Apr. 9, 2020

(86) PCT No.: PCT/JP2020/015955
§ 371 (c)(1),
(2) Date: Aug. 29, 2022

(87) PCT Pub. No.: WO2021/205597
PCT Pub. Date: Oct. 14, 2021

(65) Prior Publication Data
US 2023/0078128 A1    Mar. 16, 2023

(51) Int. Cl.
*G01D 5/20* (2006.01)
*B62D 5/04* (2006.01)

(52) U.S. Cl.
CPC ............. *G01D 5/20* (2013.01); *B62D 5/0481* (2013.01)

(58) Field of Classification Search
CPC .......... G01D 5/20; G01D 3/02; G01D 5/2046; B62D 5/0481
See application file for complete search history.

(56) References Cited

U.S. PATENT DOCUMENTS 4,970,423 A * 11/1990 Tamae ................. H02K 29/08
310/68 B
5,300,884 A * 4/1994 Maestre ............... G01D 5/2046
310/68 B
(Continued)

FOREIGN PATENT DOCUMENTS

JP    2010-002205 A    1/2010
JP    2013-247828 A    12/2013

OTHER PUBLICATIONS

International Search Report for PCT/JP2020/015955, dated Jun. 30, 2020.
(Continued)

*Primary Examiner* — Akm Zakaria
(74) *Attorney, Agent, or Firm* — Sughrue Mion, PLLC; Richard C. Turner

(57) ABSTRACT

To solve a problem that the accuracy of angle detection deteriorates owing to noise voltage generated by eccentricity or variation in shape among rotors according to the number of magnetic poles of a rotor core of a multiple-system rotation sensor, the number S of magnetic poles of a stator core is, with the number R of the magnetic poles of the rotor core and the number N (N is a natural number equal to or larger than 2) of systems for stator windings, in a relationship of S=nRN (n is a natural number), system windings of each system are wound so as to be divided for every R magnetic poles among the S magnetic poles of the stator core, and a winding arrangement of the system windings of each system is made so as to achieve R-times rotational symmetry about a rotor rotation axis.

20 Claims, 12 Drawing Sheets

(56) References Cited

U.S. PATENT DOCUMENTS

| | | | |
|---|---|---|---|
| 2011/0068780 A1* | 3/2011 | Sakai | G01D 5/145 |
| | | | 324/207.25 |
| 2017/0349211 A1* | 12/2017 | Shiino | G01B 7/30 |
| 2019/0044419 A1* | 2/2019 | Matsunawa | H02K 11/225 |
| 2021/0096000 A1* | 4/2021 | Ge | H02K 1/16 |
| 2022/0276073 A1* | 9/2022 | Kinashi | G01D 5/20 |

OTHER PUBLICATIONS

Chinese Office Action dated Aug. 27, 2024 in Application No. 202080099209.1.

* cited by examiner

| NUMBER OF ROTOR MAGNETIC POLES | NUMBER OF STATOR MAGNETIC POLES |
|---|---|
| 3 | 12 |
| 3 | 18 |
| 4 | 16 |
| 4 | 24 |
| 5 | 15 |
| 5 | 20 |
| 6 | 24 |
| 6 | 36 |

| NUMBER OF ROTOR MAGNETIC POLES | NUMBER OF STATOR MAGNETIC POLES |
|---|---|
| 3 | 18 |
| 3 | 27 |
| 4 | 12 |
| 4 | 24 |
| 4 | 36 |
| 5 | 15 |
| 5 | 30 |
| 5 | 45 |
| 6 | 18 |
| 6 | 36 |
| 6 | 54 |

MULTIPLE-SYSTEM ROTATION SENSOR, AND ELECTRIC POWER STEERING DEVICE PROVIDED WITH MULTIPLE-SYSTEM ROTATION SENSOR

CROSS REFERENCE TO RELATED APPLICATIONS

This application is a National Stage of International Application No. PCT/JP2020/015955 filed Apr. 9, 2020.

TECHNICAL FIELD

The present disclosure relates to a multiple-system rotation sensor and an electric power steering device provided with the multiple-system rotation sensor.

BACKGROUND ART

Conventionally, a winding structure of a multiple-system rotation sensor including a stator having a large number of magnetic poles projecting inward at equal intervals and stator windings wound on the respective magnetic poles, has been known, and the winding structure employs a winding arrangement in which: the stator windings are formed as first-system windings and second-system windings; and the system windings are alternately wound such that system windings of each system are arranged at intervals of one magnetic pole or at intervals of two magnetic poles (see, for example, Patent Document 1).

CITATION LIST

Patent Document

Patent Document 1: Japanese Laid-Open Patent Publication No. 2013-247828

SUMMARY OF THE INVENTION

Problems to be Solved by the Invention

In the multiple-system rotation sensor, the system windings forming the stator windings are, without being dependent on the number of rotor magnetic poles, alternately wound at intervals of a predetermined number of magnetic poles. Here, if manufacturing variation in shape among rotors, eccentricity, or the like occurs, a noise voltage based on a rotational frequency is applied to each system winding. Therefore, this winding arrangement has a problem that the accuracy of angle detection deteriorates owing to the applied noise voltage.

The present disclosure has been made to solve the above problem, and an object of the present disclosure is to provide a multiple-system rotation sensor having a winding arrangement that improves the accuracy of angle detection.

Solution to the Problems

A multiple-system rotation sensor according to the present disclosure includes: a stator core having S magnetic poles arranged at equal intervals; stator windings wound on the magnetic poles, the stator windings being formed as system windings of systems, the number of the systems being N (N is a natural number equal to or larger than 2); and a rotor core disposed so as to face the stator core and having R magnetic poles, wherein each stator winding is composed of an excitation winding and two phases of output windings, the number S of the magnetic poles of the stator core is, with the number R of the magnetic poles of the rotor core and the number N of the systems for the stator windings, in a relationship of S=nRN (n is a natural number), system windings of each system are wound so as to be divided for every R magnetic poles among the S magnetic poles of the stator core, and a winding arrangement of the system windings of each system is made so as to achieve R-times rotational symmetry about a rotor rotation axis.

Effect of the Invention

In the multiple-system rotation sensor according to the present disclosure, the system windings of each system of the stator windings are in a winding arrangement corresponding to the number R of the magnetic poles of the rotor core. Therefore, the phase of a noise voltage due to manufacturing variation in shape among rotors, eccentricity, or the like becomes 360/R° between the stator magnetic poles on which the system windings of each system are wound. Consequently, the noise voltage to be applied to the system windings of each system is reduced, whereby the accuracy of angle detection is improved.

DESCRIPTION OF EMBODIMENTS

Figure 1:
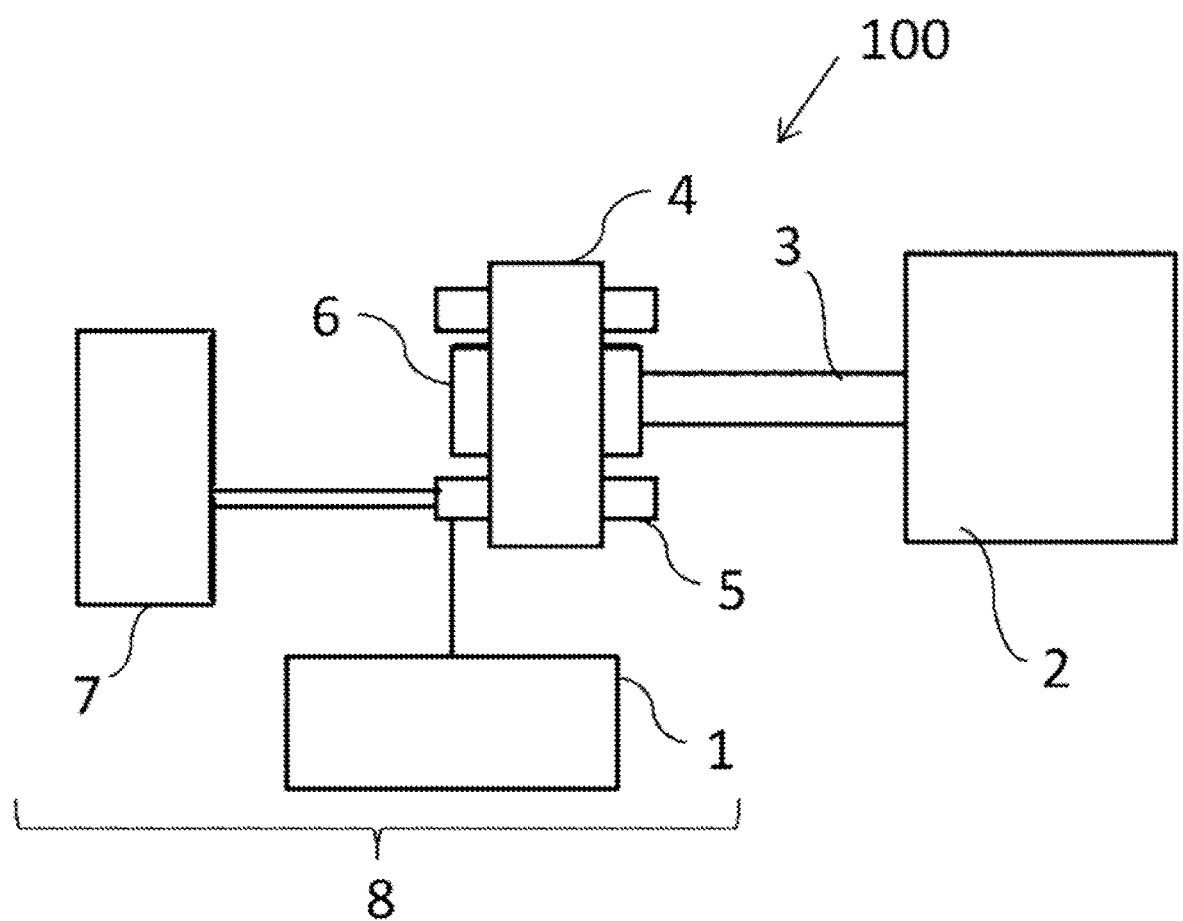
FIG. 1 is a configuration diagram of a motor system in which a multiple-system rotation sensor according to embodiment 1 is used.

Hereinafter, multiple-system rotation sensors according to preferred embodiments of the present disclosure will be described with reference to the drawings. The same feature and corresponding parts are denoted by the same reference characters, and detailed descriptions thereof will be omitted. In the subsequent embodiments as well, redundant descriptions of components denoted by the same reference characters will be omitted.

Embodiment 1

<Configuration Regarding Two Systems Provided in Series>

A configuration of a motor system in which a multiple-system rotation sensor according to the present embodiment is used, will be described with reference to FIG. 1. FIG. 1 is a configuration diagram showing a motor system 100 in which the multiple-system rotation sensor is used. The motor system 100 is composed of a rotary electric machine 2, a shaft 3, and a multiple-system rotation sensor 8. The rotary electric machine 2 indicates, for example, a motor provided in an automobile. The rotary electric machine 2 and the multiple-system rotation sensor 8 are connected to each other via the shaft 3. The multiple-system rotation sensor 8 is composed of: a rotor core 6 to which the shaft 3 is connected and which forms a rotor rotatable about the shaft 3; a stator core 4 facing the rotor core 6; stator windings 5 wound on the stator core 4; and an excitation circuit unit 1 and an angle computation unit 7 connected to the stator windings 5.

Figure 2:
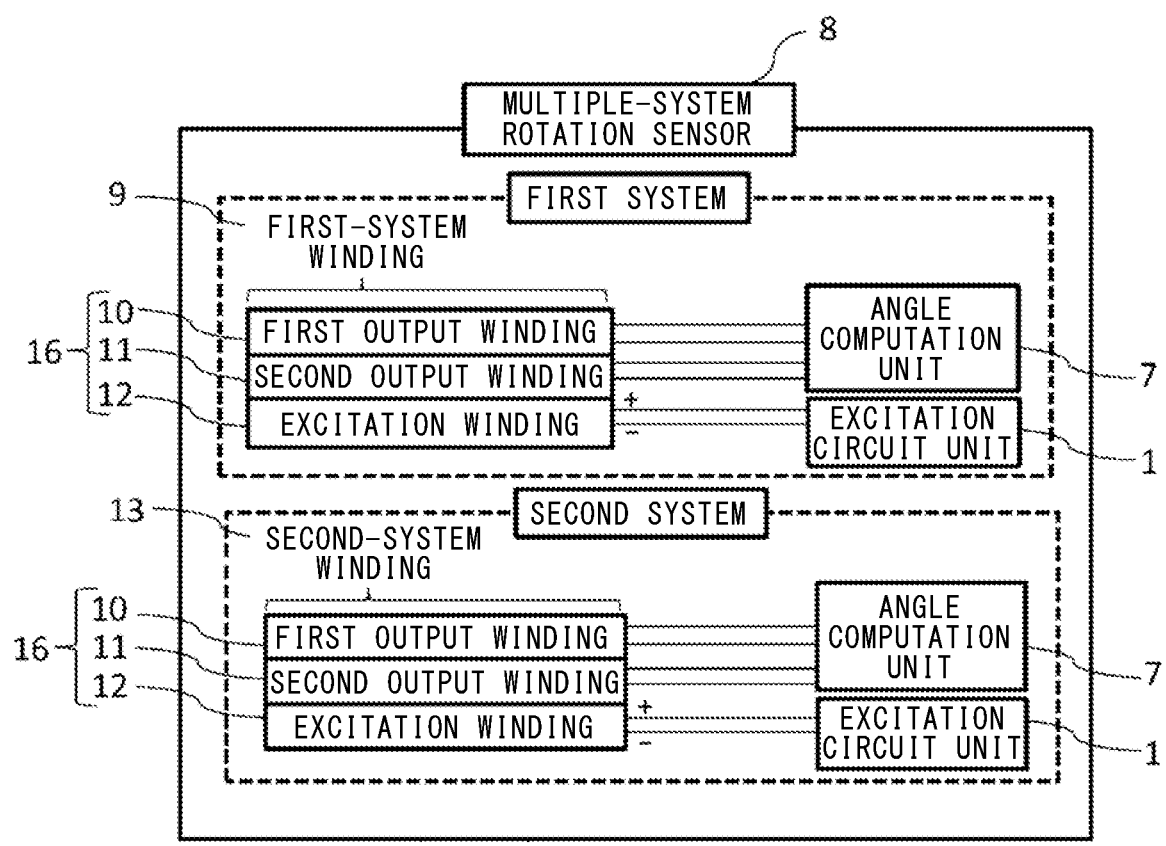
FIG. 2 is a diagram showing a circuit configuration in a case where system windings of two systems have been applied to the multiple-system rotation sensor according to embodiment 1.

A circuit configuration of the multiple-system rotation sensor 8 will be described with reference to FIG. 2. FIG. 2 is a circuit configuration diagram of the multiple-system rotation sensor 8 in which system windings of two systems have been applied. The stator windings 5 of the multiple-system rotation sensor 8 shown in FIG. 1 are, in FIG. 2, formed as windings of two systems, i.e., first-system windings 9 and second-system windings 13. Each system winding 16 is composed of a first output winding 10, a second output winding 11, and an excitation winding 12.

The first output winding 10 and the second output winding 11 are connected to the angle computation unit 7, and the excitation winding 12 of each system is connected to the excitation circuit unit 1. Different angle computation units 7 may be provided to the respective systems, and different excitation circuit units 1 may be provided to the respective systems. Alternatively, a configuration may be employed in which the plurality of systems are connected to one excitation circuit unit 1 and one angle computation unit 7.

Figure 3:
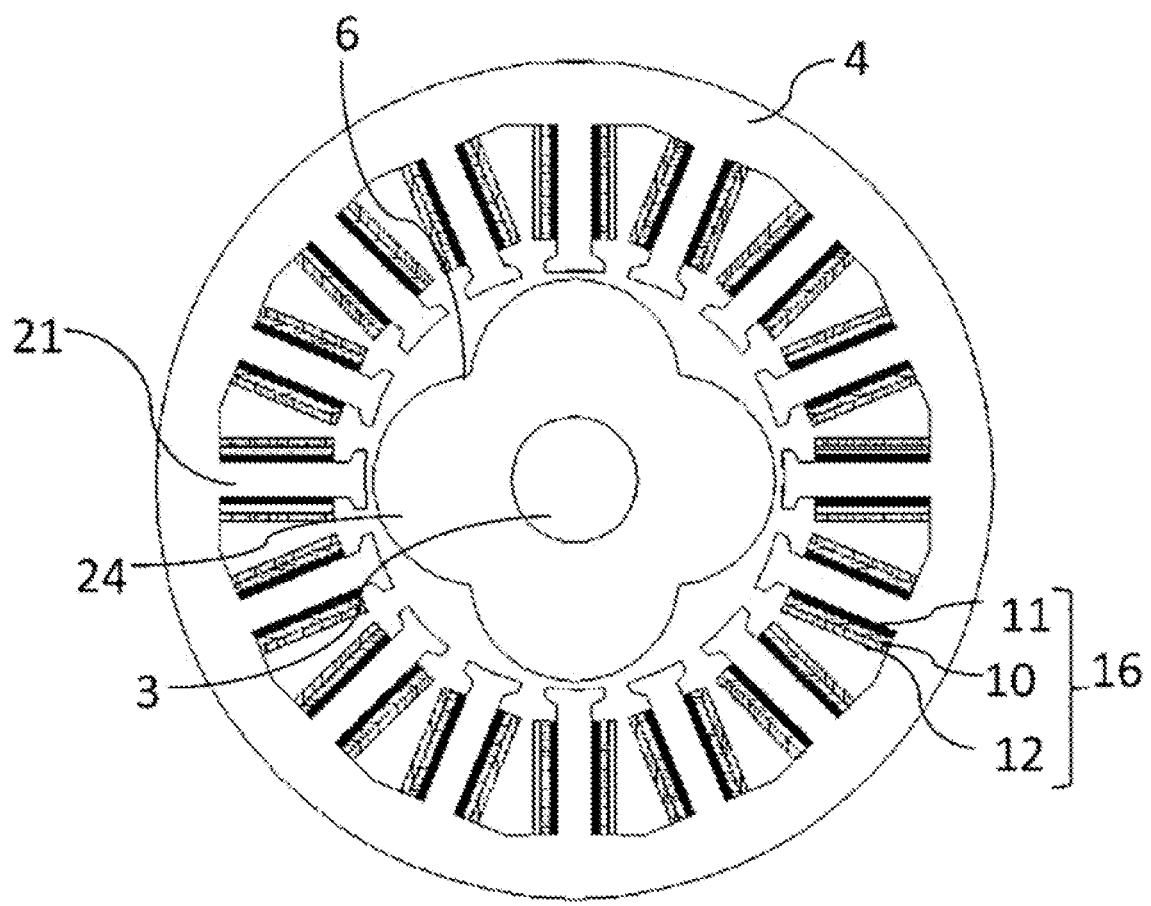
FIG. 3 is a diagram showing a configuration of a rotor core and a stator core of the multiple-system rotation sensor according to embodiment 1.

Next, a configuration of the rotor core 6 and the stator core 4 of the multiple-system rotation sensor 8 will be described with reference to FIG. 3. FIG. 3 is a configuration diagram of the rotor core 6 and the stator core 4 of the multiple-system rotation sensor 8 in which the system windings 16 of the two systems have been applied. The rotor core 6 is located on the radially inner side relative to the stator core 4. The rotor core 6 has a plurality of rotor magnetic poles 24 having projecting shapes such that the outer diameter of the rotor core 6 is changed at intervals that are equal to each other in the circumferential direction thereof. The stator core 4 has a plurality of stator magnetic poles 21 projecting inward at intervals that are equal to each other in the circumferential direction. The rotor magnetic poles 24 and the stator magnetic poles 21 are arranged so as to face each other.

The shaft 3 having a rotation axis is connected to a radially inner portion of the rotor core 6. Here, the rotor core 6 and the shaft 3 may be integrated with each other. The system windings 16 are wound on the stator magnetic poles 21. Here, each one of the system windings 16 is wound on one stator magnetic pole 21. Regarding the order of winding the excitation winding 12, the first output winding 10, and the second output winding 11 composing each system winding 16, any of the windings may be wound first.

Figures 4, 5:
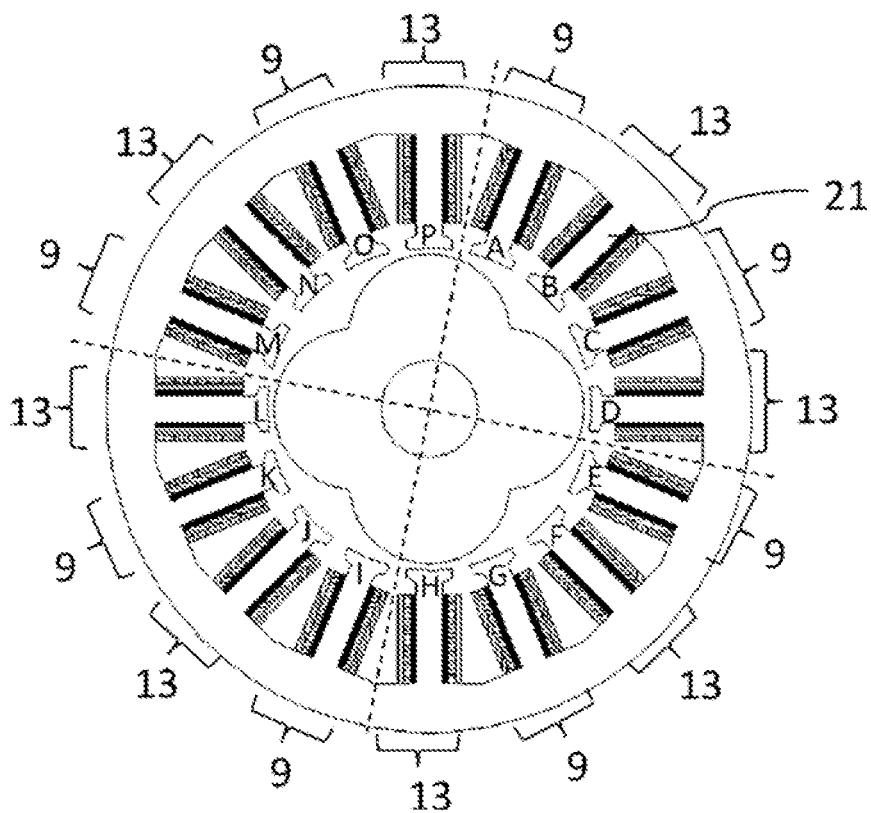
FIG. 4 is a diagram showing a relationship between the number of rotor magnetic poles and the number of stator magnetic poles in the multiple-system rotation sensor according to embodiment 1 in which the system windings of the two systems have been applied.
FIG. 5 is a diagram showing an arrangement of system windings wound on respective stator magnetic poles in embodiments 1 and 2.

Next, the relationship between the rotor magnetic poles 24 and the stator magnetic poles 21 implemented with the system windings 16 of the two systems, and an example of the arrangement of the system windings 9 and 13 of the two systems, will be described with reference to FIG. 4 to FIG. 7. FIG. 4 shows an example of combinations between the number of the rotor magnetic poles and the number of the stator magnetic poles in the multiple-system rotation sensor 8 in which the system windings 9 and 13 of the two systems have been applied. If the number N of the systems for the system windings 16 is defined as 2, the number of the rotor magnetic poles of the rotor core 6 is defined as R, and n is defined as a natural number, the number S of the stator magnetic poles of the stator core 4 is expressed with the following expression. Here, the combinations shown in FIG. 4 are merely an example, and a combination that satisfies the expression (1) only has to obtained.

[Mathematical 1]

$$S = nRN \qquad \text{expression (1)}$$

FIG. 5 shows an example of the arrangement of the system windings wound on the stator magnetic poles in the case of satisfying R=4, N=2, n=2, and S=16. The positions of the stator magnetic poles 21 on which the system windings 9, 13 of each system are wound are such that an arrangement is made so as to achieve four-times rotational symmetry in the circumferential direction about a rotor rotation axis.

The number of the stator magnetic poles on which the system windings 9, 13 of each system are wound, is S/N=8. In the drawing, the stator magnetic poles are denoted by reference characters A to P, the first-system windings 9 are wound on stator magnetic poles (A, E, I, and M) and stator magnetic poles (C, G, K, and O), and the second-system windings 13 are wound on stator magnetic poles (B, F, J, and N) and stator magnetic poles (D, H, L, and P).

In this manner, the system windings 9, 13 of each system only have to be wound on the respective magnetic poles so as to achieve four-times rotational symmetry. For example, as in FIG. 6, a winding arrangement may be employed in which: the first-system windings 9 are wound on the stator magnetic poles (A, E, I, and M) and the stator magnetic poles (B, F, J, and N); and the second-system windings 13 are wound on the stator magnetic poles (C, G, K, and O) and the stator magnetic poles (D, H, L, and P).

Figure 7:
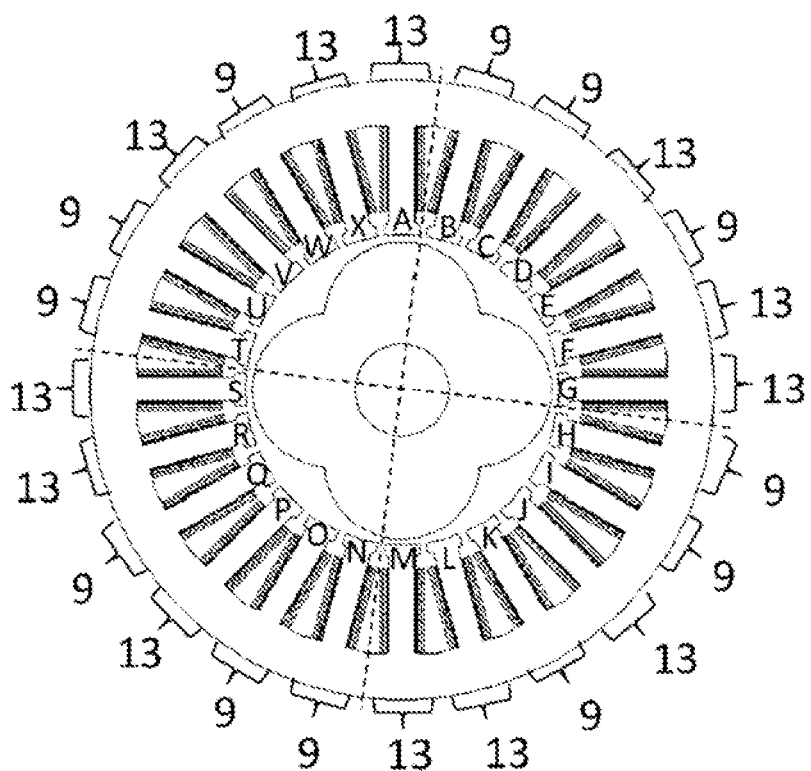
FIG. 7 is a diagram showing another arrangement of the system windings wound on the respective stator magnetic poles in embodiment 1.

Alternatively, in the case of satisfying R=4, N=2, n=34, and S=24 as in FIG. 7, a winding arrangement may be employed in which: the first-system windings 9 are wound on stator magnetic poles (B, H, N, and T), stator magnetic poles (C, I, O, and U), and stator magnetic poles (E, K, Q, and W); and the second-system windings 13 are wound on stator magnetic poles (D, J, P, and V), stator magnetic poles (F, L, R, and X), and stator magnetic poles (G, M, S, and A).

Figure 8:
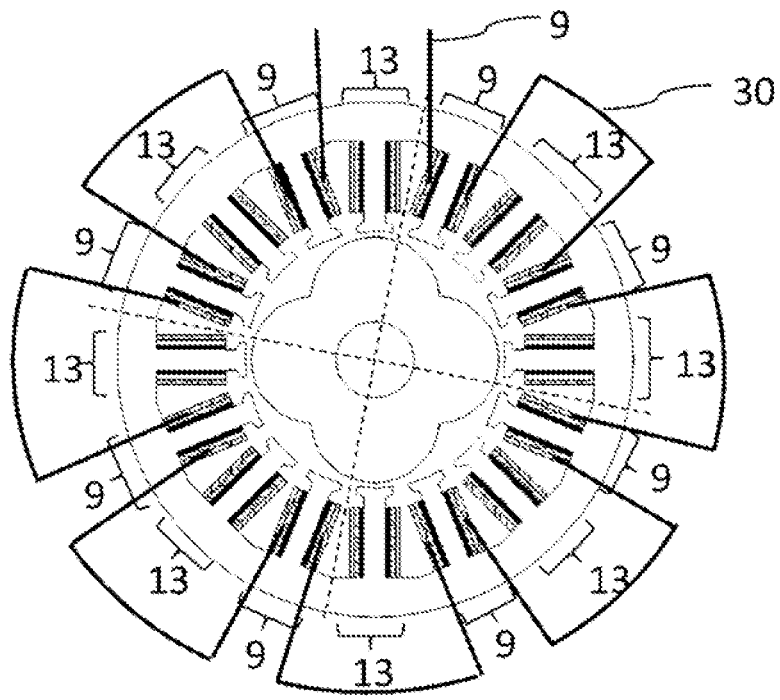
FIG. 8 is a diagram showing an example of wire connection between system windings of a same one of the systems in the multiple-system rotation sensor according to embodiment 1.

System windings 16 of a same one of the systems wound on respective ones of the stator magnetic poles 21 are connected in series to each other. FIG. 8 shows an example of wire connection when all of the windings of the same system are connected in series. In the case of series connection, a configuration in which series connection between the stator magnetic poles is performed by using jumper wires 30 is contemplated. Alternatively, a configuration may be employed in which a terminal block is provided instead of the jumper wires 30 so as to perform the connection.

Operation

Next, an operation in the present embodiment will be described first with reference to FIG. 3. The rotor core 6 is rotated in synchronization with the rotary electric machine 2. By applying voltage from the excitation circuit unit 1 shown in FIG. 1 or FIG. 2 to the excitation winding 12 of each system, a predetermined level of current flows through the excitation winding 12, and magnetic fluxes are generated inside the rotor core 6 and the stator core 4. At this time, a circumferential-direction distribution regarding the outer diameter of the rotor core 6 is changed in association with rotation of the rotor core 6. Thus, a sinusoidal voltage having a frequency $R\omega$ corresponding to the number R of the magnetic poles of the rotor core 6 is induced according to a rotational frequency $\omega$ with respect to the first output winding 10 and the second output winding 11 of each system. The angle computation unit 7 calculates a phase of the sinusoidal voltage, to compute a rotor angle.

Advantageous Effect

Next, an advantageous effect of the present embodiment will be described with reference to FIG. 5. As described above, the positions of the stator magnetic poles on which the system windings 9, 13 of each system are wound are such that an arrangement is made so as to achieve rotational symmetry R times, i.e., four times, in the circumferential direction about the rotor rotation axis. Specifically, as in FIG. 4, the first-system windings 9 are wound on the stator magnetic poles (A, E, I, and M) and the stator magnetic poles (C, G, K, and O), and the second-system windings 13 are wound on the stator magnetic poles (B, F, J, and N) and the stator magnetic poles (D, H, L, and P). In addition, the outer diameter of the rotor core 6 is changed in association with rotation of the rotor core 6, whereby a sinusoidal voltage is induced with respect to the first output winding 10 and the second output winding 11 of each system.

Figure 9:
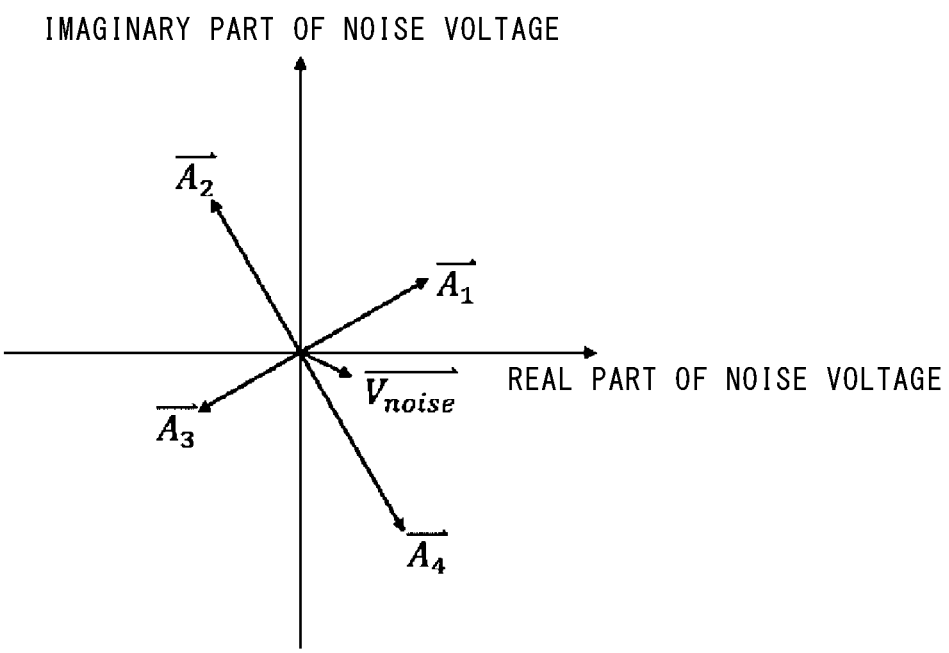
FIG. 9 is a diagram showing complex vectors of respective noise voltages induced with respect to first-system windings in embodiment 1.

If the rotor core 6 is in dynamic eccentricity, or there is difference in shape among rotor cores 6 owing to manufacturing variation, a noise voltage having the rotational frequency $\omega$ is induced in addition to a sinusoidal voltage having the frequency $R\omega$ with respect to the first output winding 10 and the second output winding 11 of each of the system windings 9 and 13. If the stator magnetic poles (A, E, I, and M) on which the first-system windings are wound are taken as examples, the inter-magnetic-pole phase difference among noise voltages at the stator magnetic poles (A, E, I, and M) is 360/R degrees. Therefore, the noise voltages are expressed as in FIG. 9 by using a complex vector space. Here, a vector $A_1$ to a vector $A_4$ indicate the vectors of the noise voltages respectively induced with respect to the stator magnetic poles (A, E, I, and M). A vector $V_{noise}$ indicates the total vector of the noise voltages respectively induced with respect to the stator magnetic poles (A, E, I, and M). The total value $V_{noise}$ of the induced noise voltages is a real part of vector $V_{noise}$ in FIG. 9. Thus, the total value $V_{noise}$ is expressed with the following expression (2), and is approximately zero.

[Mathematical 2]

$$V_{noise} = A_1\cos(\omega t + \theta_0) + A_2\cos\left(\omega t + \theta_0 + \frac{2\pi}{360} \times \frac{360}{R}\right) + \\ A_3\cos\left(\omega t + \theta_0 + \frac{2\pi}{360} \times \frac{360}{R} \times 2\right) + \\ A_4\cos\left(\omega t + \theta_0 + \frac{2\pi}{360} \times \frac{360}{R} \times 3\right) \approx 0$$

expression (2)

In this expression, each of $A_1$ to $A_4$ represents the amplitude of the corresponding one of the noise voltages respectively induced with respect to the stator magnetic poles (A, E, I, and M), $\theta_0$ represents the initial phase of the noise voltage, and $\omega$ represents the frequency of the noise voltage.

The above expression (2) is satisfied in the same manner also regarding the other stator magnetic poles on which the system windings 9 and 13 are wound, i.e., the stator magnetic poles (C, G, K, and O), the stator magnetic poles (B, F, J, and N), and the stator magnetic poles (D, H, L, and P). Consequently, an error in angle detection by the multiple-system rotation sensor due to noise voltage can be reduced, whereby the accuracy of angle detection can be improved. The structure for obtaining the above advantageous effect is not limited to the structure in FIG. 5. The advantageous effect is obtained by all of structures in which the system windings 16 are arranged so as to achieve R-times symmetry in the circumferential direction, i.e., structures in which a winding arrangement of the system windings of each system wound on the respective stator magnetic poles is made so as to achieve R-times rotational symmetry about the rotor rotation axis.

In addition, as described above, the positions of the stator magnetic poles on which the system windings of each system are wound only have to be such that an arrangement is made so as to achieve R-times symmetry in the circumferential direction. Thus, it is also possible to employ a configuration in which, as the system windings of each system, the system windings 16 of each of the different systems are arranged at intervals of S/RN stator magnetic poles. For example, as in FIG. 6, a winding arrangement may be employed in which: the first-system windings 9 are wound on the stator magnetic poles (A, E, I, and M) and the stator magnetic poles (B, F, J, and N); and the second-system windings 13 are wound on the stator magnetic poles (C, G, K, and O) and the stator magnetic poles (D, H, L, and P). With such a configuration, the lengths of the jumper wires between the magnetic poles for the system windings of each system can be minimized, whereby manufacturability can be improved.

In addition, it is also possible to employ a configuration in which, as the system windings of each system, the system windings 16 of each of the different systems are arranged at intervals of one stator magnetic pole. As in FIG. 5, a winding arrangement may be employed in which: the first-system windings 9 are wound on the stator magnetic poles (A, E, I, and M) and the stator magnetic poles (C, G, K, and O); and the second-system windings 13 are wound on the stator magnetic poles (B, F, J, and N) and the stator magnetic poles (D, H, L, and P). Consequently, arrangement of the system windings of each system onto the respective magnetic poles can be performed evenly over the entire circumference as much as possible, whereby the accuracy of angle detection can be improved.

Figure 6:
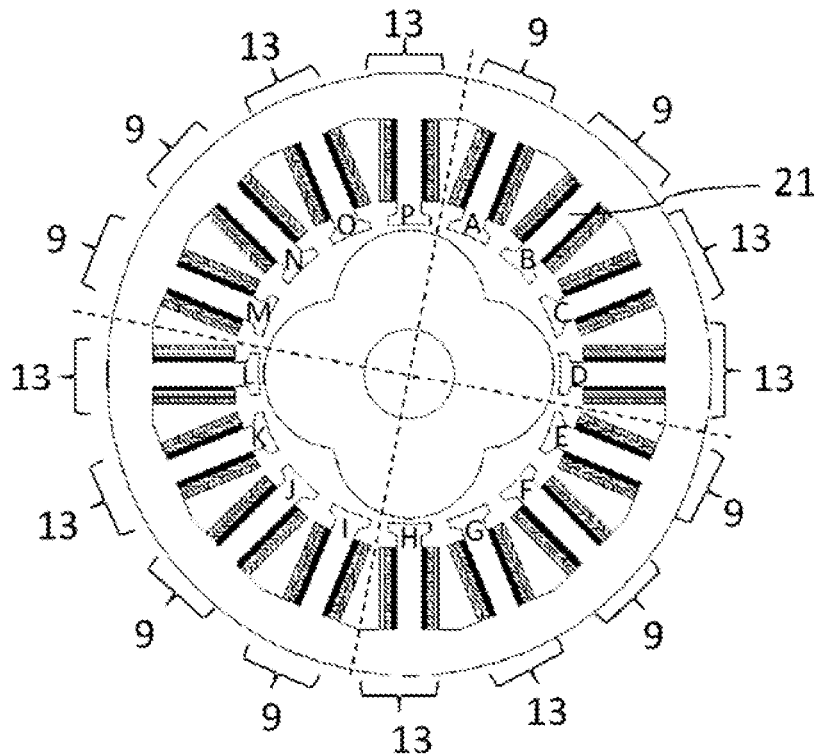
FIG. 6 is a diagram showing another arrangement of the system windings wound on the respective stator magnetic poles in embodiment 1.

In FIG. 5 to FIG. 7, the number of all of the stator magnetic poles on which the system windings 16 of each system are wound, is S/N. Consequently, the number of the stator magnetic poles on which the system windings are wound is the same between the systems, and thus the accuracy of angle detection of the system windings can be set to be the same between the systems.

In addition, the winding arrangement is not limited to the above winding arrangements, and the same advantageous effect can be obtained with the winding arrangement being freely changed according to circumstances related to manufacturability or the like. Thus, improvement in manufacturability can be achieved.

Embodiment 2

<Configuration Regarding Two Systems Provided in Series and Same Number of Turns>

An example of the arrangement of the system windings 9, 13 of each system described in embodiment 1 is as follows. In, for example, FIG. 5, windings of a same one of the systems wound on every S/R stator magnetic poles, i.e., every four stator magnetic poles, have been wound by a same number of turns and are connected to each other.

Specifically, regarding the first-system windings 9, the first output windings 10 having the same number of turns and the second output windings 11 having the same number of turns are wound on the stator magnetic poles (A, E, I, and M), and the first output windings 10 having the same number of turns and the second output windings 11 having the same number of turns are wound on the stator magnetic poles (C, G, K, and O). Likewise, regarding the second-system windings 13, the first output windings 10 having the same number of turns and the second output windings 11 having the same number of turns are wound on the stator magnetic poles (B, F, J, and N), and the first output windings 10 having the same number of turns and the second output windings 11 having the same number of turns are wound on the stator magnetic poles (D, H, L, and P).

However, regarding the first-system windings 9, the windings may be wound on the stator magnetic poles (A, E, I, and M) and the stator magnetic poles (C, G, K, and O) by different numbers of turns. Likewise, regarding the second-system windings 13 as well, the windings may be wound on the stator magnetic poles (B, F, J, and N) and the stator magnetic poles (D, H, L, and P) by different numbers of turns. Further, the first output winding 10 and the second output winding 11 composing each first-system winding 9 and each second-system winding 13 may be wound by different numbers of turns.

Further, although a case where the number of the systems is 2 is shown in FIG. 5, the present disclosure is not limited to this case. The number of the rotor magnetic poles and the number of the stator magnetic poles only have to satisfy the expression (1), and the positions of the stator magnetic poles 21 on which the system windings 16 of each system are wound only have to be such that an arrangement is made so as to achieve R-times symmetry in the circumferential direction. That is, a winding arrangement of the system windings of each system wound on the respective stator magnetic poles only has to be made so as to achieve R-times rotational symmetry about the rotor rotation axis.

Advantageous Effect

Next, an advantageous effect of the present embodiment will be described with reference to FIG. 5. As described above, windings of a same one of the systems wound on every S/R stator magnetic poles have been wound by a same number of turns and are connected to each other. For example, as in FIG. 5, regarding the first-system windings 9, the first output windings 10 having the same number of turns and the second output windings 11 having the same number of turns are wound on the stator magnetic poles (A, E, I, and M). In this case, if the rotor core 6 is in dynamic eccentricity, or there is difference in shape among rotor cores 6 owing to manufacturing variation, the amplitude of a noise voltage induced with respect to each of the first output winding 10 and the second output winding 11 composing the first-system winding 9 becomes the same among the stator magnetic poles (A, E, I, and M) on which the first-system windings 9 are wound. Therefore, the total value $V_{noise}$ of the induced noise voltages becomes zero according to the following expression (3).

[Mathematical 3]

$$V_{noise} = A\cos(\omega t + \theta_0) + A\cos\left(\omega t + \theta_0 + \frac{2\pi}{360} \times \frac{360}{R}\right) + \\ A\cos\left(\omega t + \theta_0 + \frac{2\pi}{360} \times \frac{360}{R} \times 2\right) + \\ A\cos\left(\omega t + \theta_0 + \frac{2\pi}{360} \times \frac{360}{R} \times 3\right) = 0$$

expression (3)

In this expression, "A"s represent the amplitudes of noise voltages respectively induced with respect to the stator magnetic poles (A, E, I, and M). The above expression (3) is satisfied also regarding the other stator magnetic poles on which the system windings 16 are wound, i.e., the stator magnetic poles (C, G, K, and O), the stator magnetic poles (B, F, J, and N), and the stator magnetic poles (D, H, L, and P). Consequently, the error, in angle detection, that is based on noise voltage generated by, for example, eccentricity or variation in shape among rotors according to a shaft angle multiplier can be further reduced, whereby the accuracy of angle detection can be improved.

The structure for achieving the above advantageous effect is not limited to the structure in FIG. 5. The advantageous effect is obtained by all of structures in which the number of the rotor magnetic poles and the number of the stator magnetic poles satisfy the expression (1), and the positions of the stator magnetic poles on which the system windings 16 of each system are wound are such that an arrangement is made so as to achieve R-times symmetry in the circumferential direction, i.e., structures in which the winding arrangement of the system windings of each system wound on the respective stator magnetic poles is made so as to achieve R-times rotational symmetry about the rotor rotation axis.

Embodiment 3

<Configuration of Outer Rotor>

Figure 10:
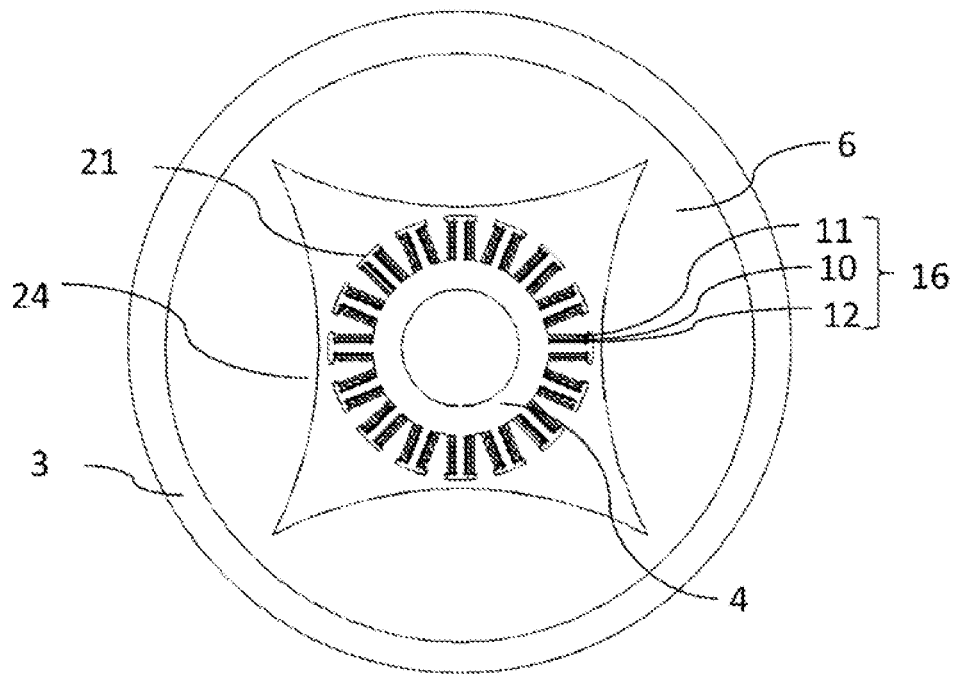
FIG. 10 is a configuration diagram showing a multiple-system rotation sensor according to embodiment 3 in which an outer rotor core is used.

FIG. 10 is a configuration diagram of a rotor core 6 and the stator core 4 in a multiple-system rotation sensor 8 in which the rotor core 6 is an outer rotor. The rotor core 6 is located on the radially outer side relative to the stator core 4. The rotor core 6 has a plurality of rotor magnetic poles 24 having projecting shapes such that the inner diameter of the rotor core 6 is changed at intervals that are equal to each other in the circumferential direction thereof. The stator core 4 has a plurality of stator magnetic poles 21 projecting outward at intervals that are equal to each other in the circumferential direction. The rotor core 6 and the stator core 4 are arranged so as to face each other. Further, the shaft 3 is connected to the radially outer side of the rotor core 6. Here, the rotor core 6 and the shaft 3 may be integrated with each other.

Advantageous Effect

Next, an advantageous effect of the present embodiment will be described with reference to FIG. 10. As described above, the rotor core 6 is located on the radially outer side relative to the stator core 4. Consequently, the same advantageous effect can be obtained while a structure in which the rotor core 6 is located on the radially inner side relative to the stator core 4 as in embodiment 1 is changed to a structure in which the rotor core 6 is located on the radially outer side relative to the stator core 4 as in the present embodiment according to circumstances related to manufacturability of the multiple-system rotation sensor or a peripheral device provided with the multiple-system rotation sensor. Therefore, the manufacturability of the multiple-system rotation sensor is improved.

Embodiment 4

<Configuration of Two Systems Provided in Parallel>

Figure 11:
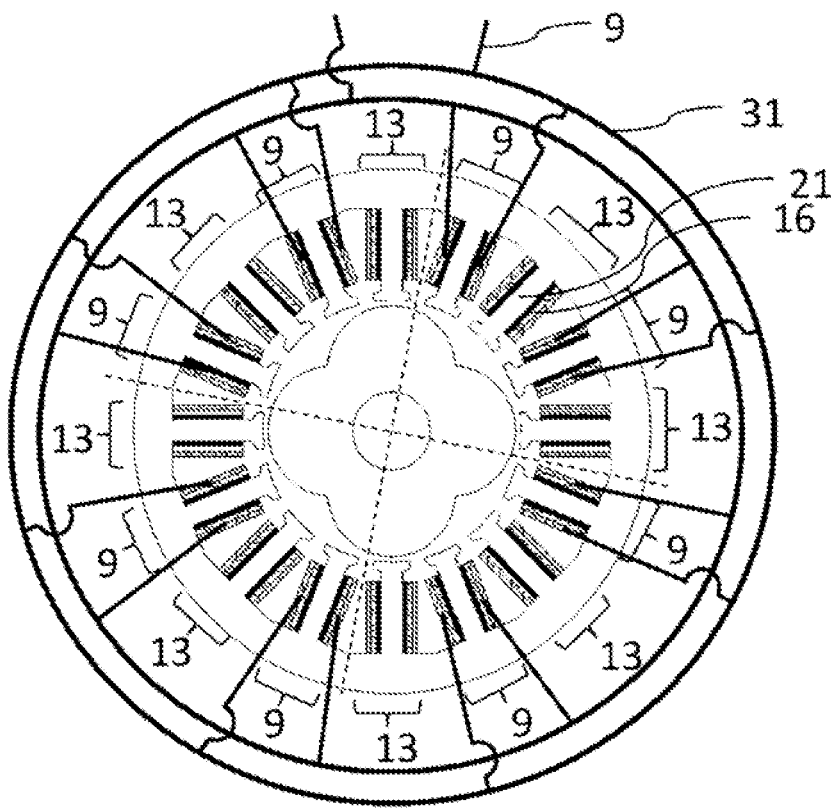
FIG. 11 is a diagram showing an example of wire connection between system windings of each system in a multiple-system rotation sensor according to embodiment 4.
Figure 12:
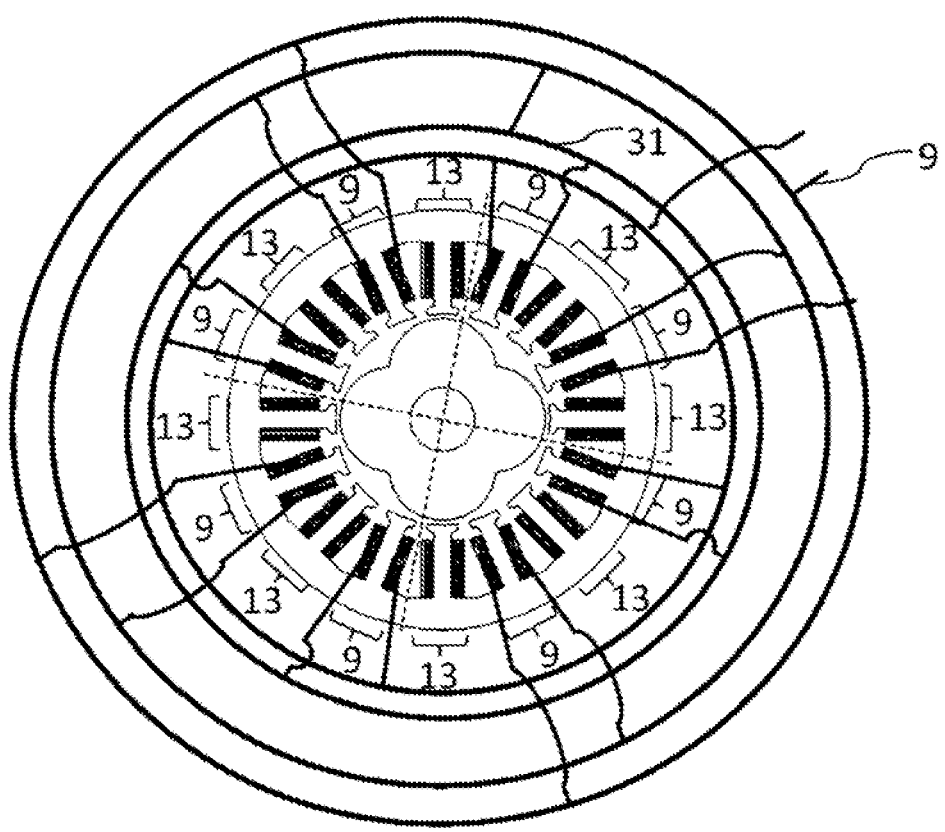
FIG. 12 is a diagram showing another example of wire connection between the system windings of each system in the multiple-system rotation sensor according to embodiment 4.

FIG. 11 and FIG. 12 are each a diagram showing an example of wire connection between the first-system windings 9 in the multiple-system rotation sensor 8 in which the system windings 16 of the two systems have been applied. As described above, each one of the system windings is wound on one stator magnetic pole 21. System windings 16 of a same one of the systems wound on the respective stator magnetic poles 21 are connected in parallel to each other. FIG. 11 shows an example of wire connection when all of the system windings of each system are connected in parallel. In the case of parallel connection as in FIG. 11, a wire connection plate 31 is provided to connect the stator magnetic poles to each other. Alternatively, a configuration may be employed in which the stator magnetic poles are connected to each other by jumper wires without providing the wire connection plate 31. The system windings of each system only have to be connected to each other, in series and/or in parallel, and series connection and parallel connection may be combined as in FIG. 12. The configuration of the present embodiment is not limited to the above configuration and encompasses all of configurations of multiple-system rotation sensors formed by a plurality of (two or more) systems.

Advantageous Effect

Next, an advantageous effect of the present embodiment will be described with reference to FIG. 11 and FIG. 12. As described above, system windings 16 of a same one of the systems wound on the respective stator magnetic poles 21 are connected in parallel to each other. Consequently, the resistance of each system winding 16 can be set to be minimum. In addition, as described above, the system windings of each system only have to be connected to each other, and, for example, series connection and parallel connection may be combined as in FIG. 12. Consequently, the same advantageous effect as that in embodiment 1 can be obtained regardless of the structure of wire connection between system windings of each system in the rotary electric machine 2. Therefore, improvement in manufacturability of windings or improvement in the degree of freedom in designing of a motor can be achieved.

Embodiment 5

<Configuration of Three or More Systems>

Figure 13:
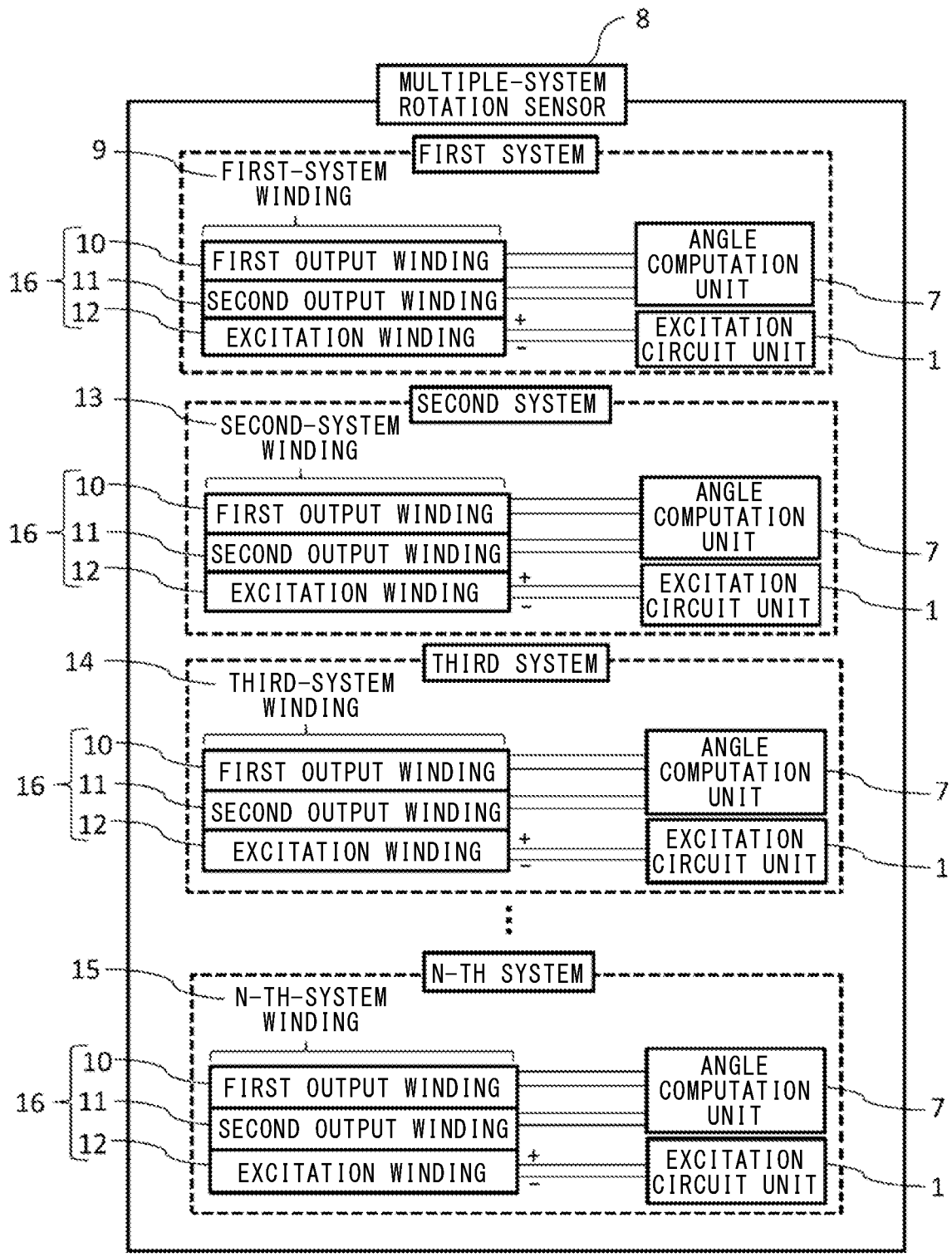
FIG. 13 is a diagram showing a circuit configuration of a multiple-system rotation sensor according to embodiment 5 in which system windings of three or more systems have been applied.
Figures 14, 15:
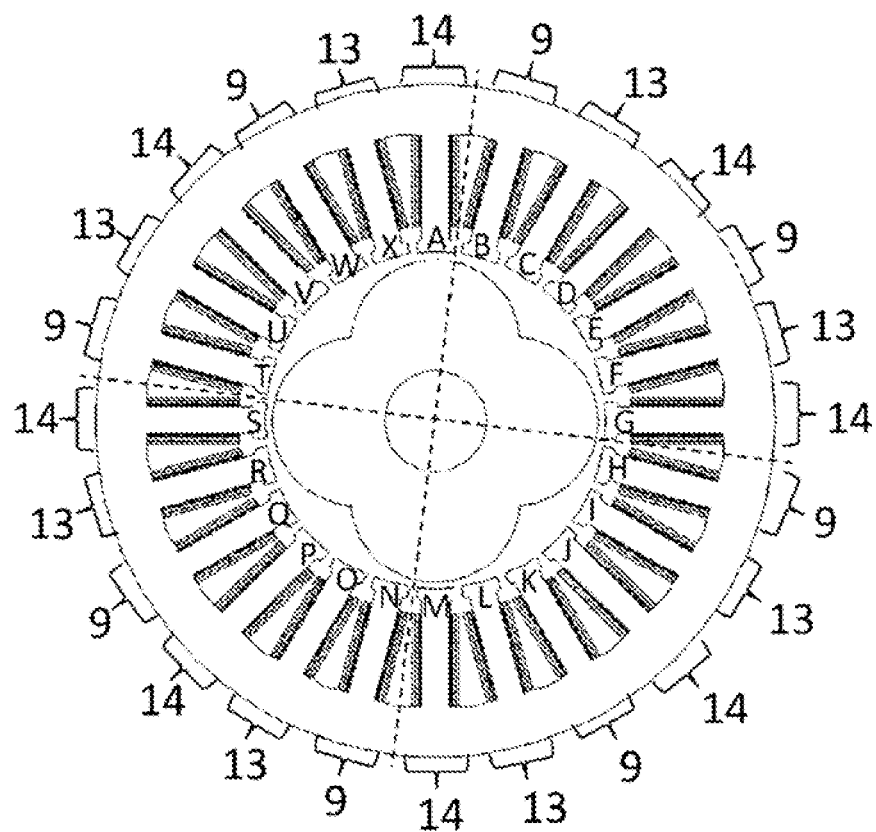
FIG. 14 is a diagram showing a relationship between the number of rotor magnetic poles and the number of stator magnetic poles in the multiple-system rotation sensor according to embodiment 5 in which system windings of three systems have been applied.
FIG. 15 is a diagram showing an arrangement in which the system windings of the three systems are wound on stator magnetic poles, in embodiment 5.

FIG. 13 is a diagram showing a circuit configuration of a multiple-system rotation sensor 8 in which windings for a plurality of systems have been applied, the number of the systems being N equal to or larger than 3. As in FIG. 13, the stator windings 5 of the multiple-system rotation sensor 8 are formed as system windings 9, 13, 14, and 15 for N systems, and each system winding 16 is composed of the first output winding 10, the second output winding 11, and the excitation winding 12. The first output winding 10 and the second output winding 11 of each system are connected to the angle computation unit 7, and the excitation winding 12 of each system is connected to the excitation circuit unit 1. Here, different angle computation units 7 may be provided to the respective systems, and different excitation circuit units 1 may be provided to the respective systems. Alternatively, a configuration may be employed in which all of the systems are connected to one excitation circuit unit 1 and one angle computation unit 7. FIG. 14 shows an example of combinations between the number R of the rotor magnetic poles and the number S of the stator magnetic poles in the case where the number of the systems is 3. The combinations shown in FIG. 14 are merely an example, and a combination that satisfies the expression (1) only has to be obtained.

FIG. 15 shows an example of the arrangement of system windings 16 of each system in the case where system windings of three systems have been applied. As described above, if the number of the systems for the system windings 16 is defined as N, the number of the rotor magnetic poles of the rotor core 6 is defined as R, and n is defined as a natural number, the number S of the stator magnetic poles of the stator core 4 is expressed with the expression (1). FIG. 15 illustrates the case of satisfying R=4, N=3, n=2, and S=24.

The positions of the stator magnetic poles on which the system windings 16 of each system are wound are such that an arrangement is made so as to achieve four-times rotational symmetry in the circumferential direction about the rotor rotation axis. Specifically, the first-system windings 9 are wound on the stator magnetic poles (B, H, N, and T) and the stator magnetic poles (E, K, Q, and W). The second-system windings 13 are wound on the stator magnetic poles (C, I, O, and U) and the stator magnetic poles (F, L, R, and X). Third-system windings 14 are wound on the stator magnetic poles (D, J, P, and V) and the stator magnetic poles (G, M, S, and A).

Figure 16:
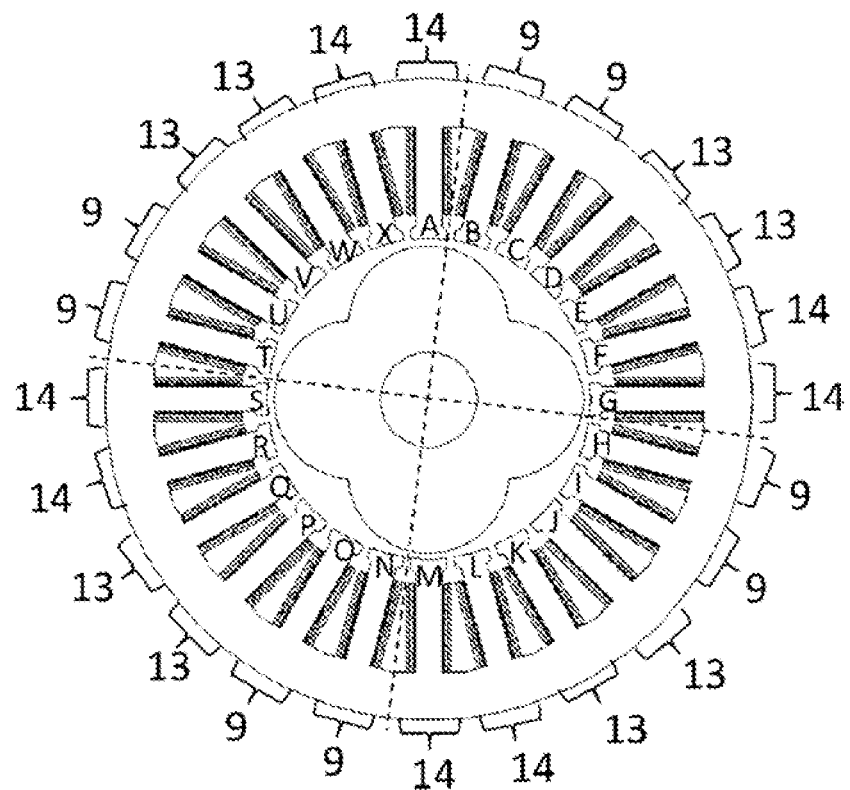
FIG. 16 is a diagram showing another arrangement in which the system windings of the three systems are wound on the stator magnetic poles, in embodiment 5.

It is noted that the system windings 16 of each system only have to be arranged so as to achieve four-times rotational symmetry about the rotor rotation axis. For example, as in FIG. 16, the first-system windings 9 are wound on the stator magnetic poles (B, H, N, and T) and the stator magnetic poles (C, I, O, and U). The second-system windings 13 are wound on the stator magnetic poles (D, J, P, and V) and the stator magnetic poles (E, K, Q, and W). The third-system windings 14 are wound on the stator magnetic poles (F, L, R, and X) and the stator magnetic poles (G, M, S, and A). Arrangement of system windings of systems (N>3) can also be made according to the same procedure. That is, a structure only has to be employed in which the winding arrangement of the system windings of each system wound on the respective stator magnetic poles is made so as to achieve R-times rotational symmetry about the rotor rotation axis.

Advantageous Effect

With such a configuration, the multiple-system rotation sensor 8 can be formed by a plurality of systems (N≥3) and can be operated even when a winding fault occurs in a plurality (two or more) of the systems. In addition, the same advantageous effect as that in the case of satisfying N=2 can be obtained also with the plurality of systems (N≥3).

Embodiment 6

<Configuration of Main System and Auxiliary System>

Figure 17:
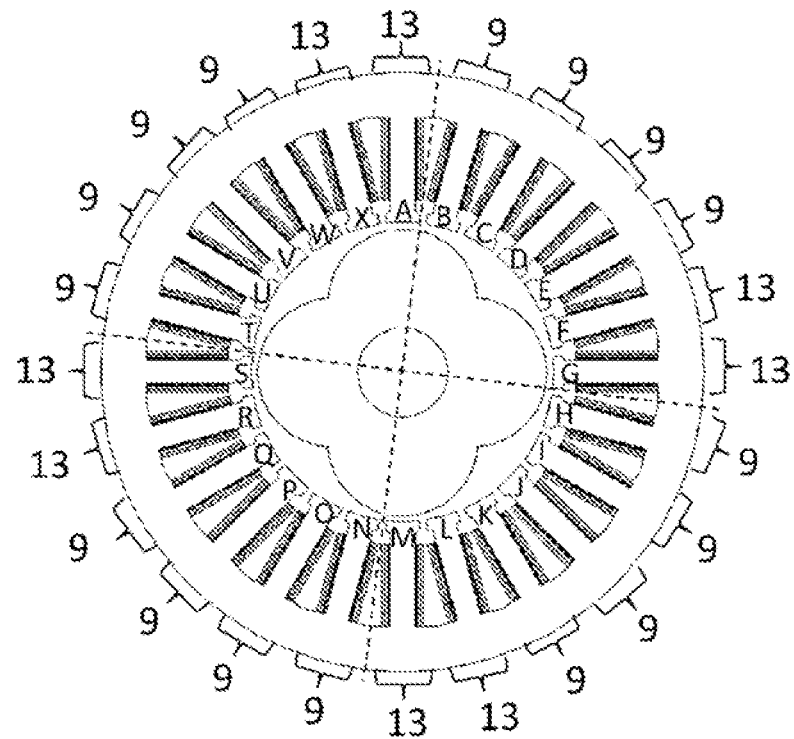
FIG. 17 is a diagram showing an arrangement in which system windings of two systems are wound on the stator magnetic poles, in embodiment 6.

FIG. 17 shows an example of the arrangement of system windings 16 in a multiple-system rotation sensor 8 in which the number of systems is 2. If the number of systems for the system windings 16 is defined as N=2, the number of the rotor magnetic poles of the rotor core 6 is defined as R, and n is defined as a natural number, the number S of the stator magnetic poles of the stator core 4 is expressed with the expression (1). FIG. 17 illustrates the case of satisfying R=4, N=2, n=3, and S=24. The positions of the stator magnetic poles on which the system windings 16 of each system are wound are such that an arrangement is made so as to achieve four-times rotational symmetry in the circumferential direction about the rotor rotation axis. Specifically, the first-system windings 9 are wound on the stator magnetic poles (B, H, N, and T), the stator magnetic poles (C, I, O, and U), the stator magnetic poles (D, J, P, and V), and the stator magnetic poles (E, K, Q, and W). The second-system windings 13 are wound on the stator magnetic poles (F, L, R, and X) and the stator magnetic poles (G, M, S, and A).

In this configuration, the number of the stator magnetic poles 21 on which the system windings 9, 13 are wound differs between the systems. This configuration is merely an example, and the multiple-system rotation sensor 8 only has to have a configuration in which: the number S of the stator magnetic poles satisfies the expression (1); and the positions of the stator magnetic poles on which the system windings 16 of each system are wound are such that an arrangement is made so as to achieve R-times symmetry in the circumferential direction. That is, the winding arrangement of the system windings of each system wound on the respective stator magnetic poles only has to be such that the system windings are arranged so as to achieve R-times rotational symmetry about the rotor rotation axis.

Advantageous Effect

With such a configuration, the number of the stator magnetic poles on which the first-system windings 9 of a main system are wound can be increased. Consequently, the accuracy of angle detection in the main system can be improved as compared to the case where the number of the stator magnetic poles 21 on which the system windings 16 are wound is the same between the systems. It is noted that, although the case of satisfying N=2 is illustrated in FIG. 17, the present disclosure is not limited to this case, and the same advantageous effect can be obtained as long as N is an integer equal to or larger than 2.

Embodiment 7

<Configuration in which Present Rotation Sensor is Mounted to Electric Power Steering>

Any of the multiple-system rotation sensors described above is applicable to an electric power steering device for a vehicle. Hereinafter, an electric power steering device according to embodiment 7 will be described with reference to FIG. 18.

Figure 18:
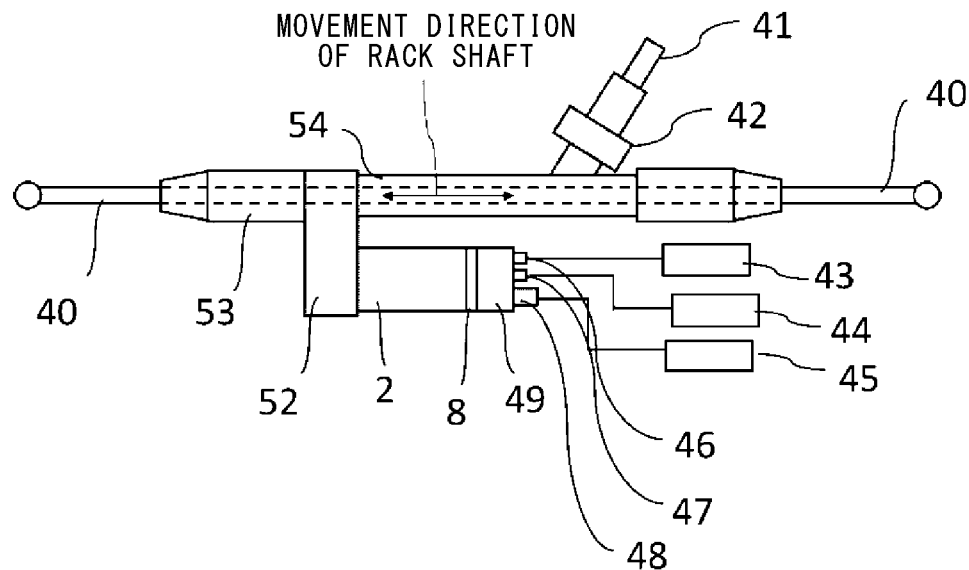
FIG. 18 is a diagram showing a configuration of an electric power steering device according to embodiment 7.

FIG. 18 is a configuration diagram of the electric power steering device for an automobile. A driver steers a steering wheel (not shown), and the torque thereof is transmitted via a steering shaft (not shown) to a shaft 41. At this time, the torque detected by a torque sensor 42 is converted into an electrical signal, and the electrical signal is transmitted through cables (not shown) to a first-system power supply source 43 and a second-system power supply source 44. Meanwhile, information about the automobile such as a vehicle speed is converted into an electrical signal and, the electrical signal is transmitted through the cables to the first-system power supply source 43 and the second-system power supply source 44. Each of the first-system power supply source 43 and the second-system power supply source 44 computes a required assist torque on the basis of the torque and the information about the automobile such as the vehicle speed, and supplies current via an electric control unit (ECU) 49 to the rotary electric machine 2. The rotary electric machine 2 is disposed so as to be oriented parallelly to a movement direction (indicated by an arrow) of a rack shaft. To each of the first-system power supply source 43 and the second-system power supply source 44, power is supplied from a battery or an alternator via a corresponding one of a power supply connector 46 and a power supply connector 47. A torque generated by the rotary electric machine 2 is reduced by a gearbox 52 including therein a belt (not shown) and a ball screw (not shown), and thrust force for moving the rack shaft (not shown) inside a housing 54 in the direction indicated by the arrow, is generated. The thrust force provides assist for the steering force of the driver.

Consequently, tie rods 40 are moved. Thus, the orientations of tires are changed, whereby the vehicle can be turned. Owing to the assist by the torque from the rotary electric machine 2, the driver can turn the vehicle with a small amount of steering force. It is noted that a rack boot 53 is provided such that no foreign object enters the device. As described with reference to FIG. 1, the multiple-system rotation sensor 8 is attached to the shaft 3 of the rotary electric machine 2. The multiple-system rotation sensor 8 detects a rotation angle of a rotor of the rotary electric machine 2 and outputs an angle signal corresponding to the rotation angle. Power is supplied from a power supply 45 via a power supply connector 48 to the ECU 49.

In such an electric power steering device, cogging torque or torque ripple generated by the rotary electric machine is transmitted via a gear to the driver. Thus, cogging torque or torque ripple is desirably reduced in order to obtain favorable steering feeling. In addition, vibrations and noise at the time of operation of the rotary electric machine are also desirably reduced.

Advantageous Effect

If any of the multiple-system rotation sensors 8 described in embodiment 1 to 6 is mounted to an electric steering device, the advantageous effect described in each embodiment is exhibited. That is, the error in angle detection by the multiple-system rotation sensor 8 can be reduced, whereby the accuracy of angle detection can be improved. Consequently, steering feeling with comfort can be obtained. In addition, the multiple-system rotation sensor 8 can be formed by a plurality of (three or more) systems, and thus can be operated even when windings of two or more of the systems experience faults. Consequently, assist force for steering can be safely outputted even when a fault occurs.

Figure 19:
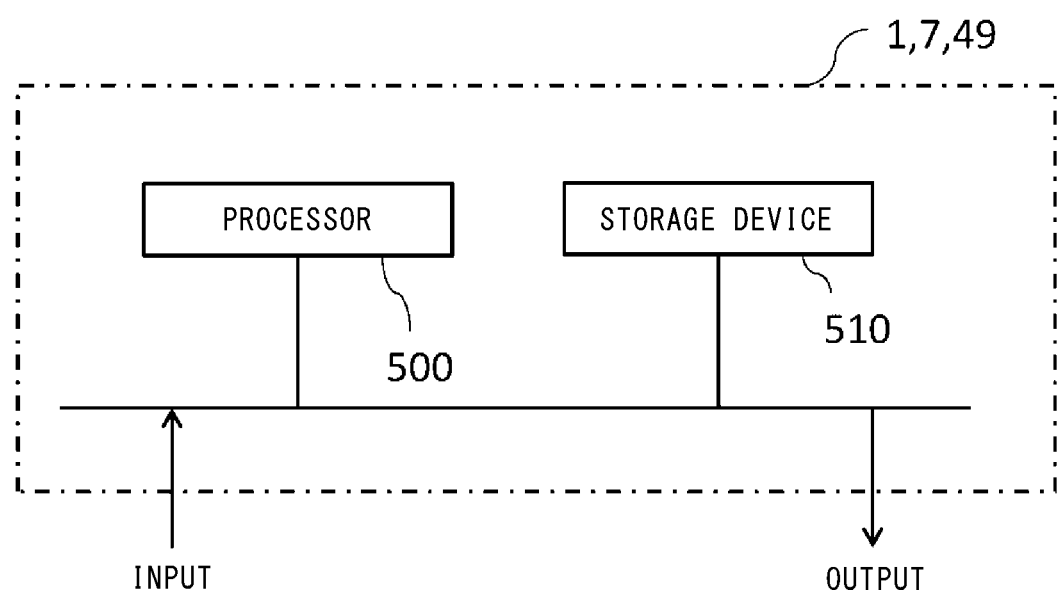
FIG. 19 is a diagram showing an example of a hardware configuration of an angle computation unit, an excitation circuit unit, and an ECU in each of embodiments 1 and 7.

It is noted that the excitation circuit unit 1 and the angle computation unit 7 shown in FIG. 1 and the ECU 49 shown in FIG. 18 may each be implemented by a microcomputer. An example of hardware of the microcomputer implementing each of the excitation circuit unit 1, the angle computation unit 7, and the ECU is shown in FIG. 19. The hardware is composed of a processor 500 and a storage device 510. Although not shown, the storage device 510 includes a volatile storage device such as a random access memory, and a nonvolatile auxiliary storage device such as a flash memory. Alternatively, the storage device may include, as the auxiliary storage device, a hard disk instead of a flash memory. The processor 500 executes a program inputted from the storage device 510, whereby, for example, the angle computation unit 7 computes an angle. In this case, the program is inputted from the auxiliary storage device via the volatile storage device to the processor 500. Further, the processor 500 may output data such as a computation result to the volatile storage device of the storage device 510 or may save the data via the volatile storage device into the auxiliary storage device.

It is noted that the hardware in each of the excitation circuit unit 1, the angle computation unit 7, and the ECU 49 does not have to be implemented by a microcomputer and may be implemented by an application specific integrated circuit (ASIC), a field programmable gate array (FPGA), a simple logic circuit, a relay, or the like.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 excitation circuit unit
2 rotary electric machine
3 shaft
4 stator core
5 stator winding
6 rotor core
7 angle computation unit
8 multiple-system rotation sensor
9 first-system winding
10 first output winding
11 second output winding
12 excitation winding
13 second-system winding
14 third-system winding
15 N-th-system winding
16 system winding
21 stator magnetic pole
24 rotor magnetic pole
30 jumper wire
31 wire connection plate

The invention claimed is:

1. A multiple-system rotation sensor comprising:
a stator core having S number of magnetic poles arranged at equal intervals (S is a natural number greater than or equal to 4);
stator windings wound on the magnetic poles, the stator windings being formed as system windings of N number of systems, the number of the systems being N (N is a natural number equal to or larger than 2); and
a rotor core disposed so as to face the stator core and having R number of magnetic poles (R is a natural number greater than 2), wherein
each stator winding is composed of an excitation winding and two phases of output windings,
wherein the numbers of magnetic poles of the stator and rotor core are in a relationship of S=nRN (n is a natural number),
system windings of each system are wound so as to be divided for every R magnetic poles among the S magnetic poles of the stator core, and
a winding arrangement of the system windings of each system is made so as to achieve R-times rotational symmetry about a rotor rotation axis.

2. The multiple-system rotation sensor according to claim 1, wherein system windings of a same one of the systems among the stator windings are wound, by a same number of turns, on magnetic poles each located at an S/R-th position in a circumferential direction of the stator core.

3. The multiple-system rotation sensor according to claim 1, wherein the system windings of each of the different systems are wound at intervals of one magnetic pole of the stator core.

4. The multiple-system rotation sensor according to claim 1, wherein the system windings of each of the different systems are wound at intervals of S/RN magnetic poles of the stator core.

5. The multiple-system rotation sensor according to claim 1, wherein the system windings of each system are wound on S/N magnetic poles of the stator core.

6. The multiple-system rotation sensor according to claim 1, wherein the number of the magnetic poles, of the stator core, on which winding is performed differs between the systems.

7. An electric power steering device comprising the multiple-system rotation sensor according to claim 1.

8. The multiple-system rotation sensor according to claim 2, wherein the system windings of each system are wound on S/N magnetic poles of the stator core.

9. The multiple-system rotation sensor according to claim 3, wherein the system windings of each system are wound on S/N magnetic poles of the stator core.

10. The multiple-system rotation sensor according to claim 2, wherein the number of the magnetic poles, of the stator core, on which winding is performed differs between the systems.

11. The multiple-system rotation sensor according to claim 3, wherein the number of the magnetic poles, of the stator core, on which winding is performed differs between the systems.

12. An electric power steering device comprising the multiple-system rotation sensor according to claim 2.

13. An electric power steering device comprising the multiple-system rotation sensor according to claim 3.

14. An electric power steering device comprising the multiple-system rotation sensor according to claim 4.

15. An electric power steering device comprising the multiple-system rotation sensor according to claim 5.

16. An electric power steering device comprising the multiple-system rotation sensor according to claim 6.

17. An electric power steering device comprising the multiple-system rotation sensor according to claim 8.

18. An electric power steering device comprising the multiple-system rotation sensor according to claim 9.

19. An electric power steering device comprising the multiple-system rotation sensor according to claim 10.

20. An electric power steering device comprising the multiple-system rotation sensor according to claim 11.

* * * * *